United States Patent
Yang et al.

(10) Patent No.: US 12,030,027 B2
(45) Date of Patent: Jul. 9, 2024

(54) HALLOYSITE NANOTUBE (HNT)-ENCAPSULATED IONIC LIQUID (IL) MICROCAPSULE, SELF-LUBRICATING FIBER TEXTILE COMPOSITE, AND PREPARATION METHOD AND USE THEREOF

(71) Applicant: LANZHOU INSTITUTE OF CHEMICAL PHYSICS, CAS, Lanzhou (CN)

(72) Inventors: Mingming Yang, Lanzhou (CN); Wenjing Wang, Lanzhou (CN); Yanling Wang, Lanzhou (CN); Zhaozhu Zhang, Lanzhou (CN); Junya Yuan, Lanzhou (CN); Wei Jiang, Lanzhou (CN); Fanjie Chu, Lanzhou (CN); Peilong Li, Lanzhou (CN)

(73) Assignee: LANZHOU INSTITUTE OF CHEMICAL PHYSICS, CAS, Lanzhou (CN)

( * ) Notice: Subject to any disclaimer, the term of this patent is extended or adjusted under 35 U.S.C. 154(b) by 0 days.

(21) Appl. No.: 18/389,432

(22) Filed: Nov. 14, 2023

(65) Prior Publication Data
US 2024/0157321 A1    May 16, 2024

(30) Foreign Application Priority Data
Nov. 14, 2022    (CN) .......................... 202211417780.0

(51) Int. Cl.
*B01J 13/02*    (2006.01)
*B82Y 40/00*    (2011.01)
(Continued)

(52) U.S. Cl.
CPC ............ *B01J 13/02* (2013.01); *C10M 125/26* (2013.01); *D06M 11/79* (2013.01); *D06M 13/352* (2013.01); *B82Y 40/00* (2013.01)

(58) Field of Classification Search
None
See application file for complete search history.

(56) References Cited

FOREIGN PATENT DOCUMENTS

| CN | 111286391 A | 6/2020 |
|---|---|---|
| CN | 115074997 A | 9/2022 |
| CN | 115787287 A | 3/2023 |

OTHER PUBLICATIONS

Office Action in Chinese Application No. 202211417780.0, dated Jun. 13, 2023.
(Continued)

*Primary Examiner* — Jeffrey D Washville
(74) *Attorney, Agent, or Firm* — MARSHALL, GERSTEIN & BORUN LLP

(57) ABSTRACT

The present disclosure belongs to the technical field of lubricating material preparation, and specifically relates to a halloysite nanotube (HNT)-encapsulated ionic liquid (IL) microcapsule, a self-lubricating fiber textile composite, and a preparation method and use thereof. In the present disclosure, the preparation method includes the following steps: dispersing a HNT and an alkali metal salt of a saturated fatty acid in water, dispersing a resulting inner surface-modified HNT and an IL in an organic solvent, injecting the IL into the HNT in the mixed dispersion under vacuumizing to obtain an IL-filled HNT, and encapsulating a resulting IL-filled HNT at a tube end with an encapsulating material to obtain the HNT-encapsulated IL microcapsule.

18 Claims, 8 Drawing Sheets

(51) Int. Cl.
    *C10M 125/26*    (2006.01)
    *D06M 11/79*     (2006.01)
    *D06M 13/352*   (2006.01)

(56) References Cited

OTHER PUBLICATIONS

Notification to Grant Patent Right for Invention for Chinese Application No. 202211417780.0, dated Aug. 30, 2023.
Liu Ling et al., "Research Progress on Application of Halloysite Nanotubes for Modification of Smart Anti-corrosion Coating", Journal of Chinese Society for Corrosion and Protection, vol. 42, No. 4,, pp. 523-530 (2022).

HALLOYSITE NANOTUBE (HNT)-ENCAPSULATED IONIC LIQUID (IL) MICROCAPSULE, SELF-LUBRICATING FIBER TEXTILE COMPOSITE, AND PREPARATION METHOD AND USE THEREOF

CROSS REFERENCE TO RELATED APPLICATION

This patent application claims the benefit and priority of Chinese Patent Application No. 202211417780.0, filed with the China National Intellectual Property Administration on Nov. 14, 2022, the disclosure of which is incorporated by reference herein in its entirety as part of the present application.

TECHNICAL FIELD

The present disclosure belongs to the technical field of lubricating material preparation, and specifically relates to a halloysite nanotube (HNT)-encapsulated ionic liquid (IL) microcapsule, a self-lubricating fiber textile composite, and a preparation method and use thereof.

BACKGROUND

The self-lubricating spherical plain bearing is a spherical sliding bearing, which is composed of an outside race, an inside race, and a fiber textile-based self-lubricating liner material between the inside and outside races. This bearing shows high load-bearing, low friction, wear resistance, long service life, and maintenance-free, and is widely used in key and important parts of aircraft transmission systems, control systems, and power systems. This component has a vital impact on aircraft flight safety. The fiber textile-based self-lubricating liner material has high load-bearing capacity, wear resistance, strong designability, and desirable dimensional stability, and is widely applied in the landing gear, flaperons, rotor systems, aviation engines and other moving parts of aviation devices, showing extremely excellent application prospects.

A large number of studies have shown that micro-nano reinforcement materials can be added to the fiber textile-based self-lubricating liner material to improve wear resistance of the fiber textile-based self-lubricating liner material. However, micro-nano materials generally lead to an increase in a friction coefficient of the liner. For large-size spherical bearings, friction conditions of the bearing during the swing motion are extremely harsh and complex, such that the bearings need to have a stable swing torque. Therefore, during the preparation of fiber textile-based self-lubricating lining materials, both the abrasion of the self-lubricating liner and the friction coefficient of the self-lubricating liner must be taken into consideration during use. Coating a surface of the liner with grease or lubricating oil can effectively reduce a bearing starting torque. However, due to the dense microstructure on a surface of the self-lubricating liner, it is difficult for the grease and lubricating oil to penetrate into the interior of the liner. As the lubricating oil or grease is exhausted during the sliding process, the friction torque of the bearing may change, causing operation unstable of the bearing. Moreover, coating a liner surface with grease or lubricating oil may cause microstructural changes such as swelling of the liner surface, resulting in reduced service life and deterioration of tribology behavior for the liner.

SUMMARY

An objective of the present disclosure is to provide a halloysite nanotube (HNT)-encapsulated ionic liquid (IL) microcapsule, a self-lubricating fiber textile composite, and a preparation method and use thereof. In the present disclosure, the HNT-encapsulated IL microcapsule is used as a lubricant additive of the self-lubricating fiber textile composite, and can realize solid-liquid composite lubrication of a friction interface of the self-lubricating fiber textile composite. In this way, on the premise of reducing abrasion of the self-lubricating fiber textile composite, a friction coefficient of the self-lubricating fiber textile composite is maintained stable during the friction.

To achieve the above objective, the present disclosure provides the following technical solutions:

The present disclosure provides a preparation method of a HNT-encapsulated IL microcapsule, including the following steps:

dispersing a HNT and an alkali metal salt of a saturated fatty acid in water, and selectively modifying an inner surface of the HNT to obtain an inner surface-modified HNT;

dispersing the inner surface-modified HNT and an IL in an organic solvent to obtain a mixed dispersion;

injecting the IL into the HNT in the mixed dispersion under vacuumizing to obtain an IL-filled HNT; and encapsulating the IL-filled HNT at a tube end with an encapsulating material to obtain the HNT-encapsulated IL microcapsule.

Preferably, the HNT has an inner diameter of 12 nm to 20 nm, an outer diameter of 45 nm to 60 nm, and a tube length of 0.2 μm to 2 μm;

the alkali metal salt of the saturated fatty acid is one or more selected from the group consisting of sodium laurate, sodium undecanoate, and sodium myristate; and the HNT and the alkali metal salt of the saturated fatty acid are at a mass ratio of (0.1-1):1.

Preferably, the IL is one or more selected from the group consisting of 1-butyl-3-methylimidazolium hexafluorophosphate, 1-butyl-3-methylimidazolium trifluoromethanesulfonate, and 1-hexyl-3-methylimidazolium bis(trifluoromethylsulfonyl)imide; and the inner surface-modified HNT and the IL are at a mass ratio of 1:(1-5).

Preferably, the vacuumizing includes circulating a vacuumizing unit n times; the vacuumizing unit includes the following stages sequentially: a vacuumizing stage, a vacuum maintaining stage, and an inflating stage; the vacuum maintaining stage maintains an ambient pressure of 0.01 atm to 0.05 atm for 5 min to 30 min; n is greater than or equal to 3;

the vacuumizing stage has a depressurization time of 10 min to 15 min; and the inflating stage has a pressurization time of 10 min to 15 min.

The present disclosure further provides a HNT-encapsulated IL microcapsule prepared by the preparation method, including a HNT and an IL encapsulated in the HNT.

The present disclosure further provides use of the HNT-encapsulated IL microcapsule as a lubricant additive.

The present disclosure further provides a self-lubricating fiber textile composite, including a self-lubricating textile and a resin and a lubricant additive that are loaded between fibers of the self-lubricating textile, where the lubricant additive is the HNT-encapsulated IL microcapsule.

Preferably, the self-lubricating textile accounts for 50 wt % to 85 wt % of the self-lubricating fiber textile composite by mass percentage; and the lubricant additive accounts for less than or equal to 3 wt % of the self-lubricating fiber textile composite by mass percentage.

The present disclosure further provides a preparation method of the self-lubricating fiber textile composite, including the following steps:
dispersing the lubricant additive in a resin solution to obtain a lubricant additive-resin dispersion;
impregnating the self-lubricating textile with the lubricant additive-resin dispersion to obtain a prepreg; and
curing the prepreg to obtain the self-lubricating fiber textile composite.

The present disclosure further provides use of the self-lubricating fiber textile composite or a self-lubricating fiber textile composite prepared by the preparation method as a self-lubricating liner.

The present disclosure provides a preparation method of a HNT-encapsulated IL microcapsule, including the following steps: dispersing a HNT and an alkali metal salt of a saturated fatty acid in water, and selectively modifying an inner surface of the HNT to obtain an inner surface-modified HNT; dispersing the inner surface-modified HNT and an IL in an organic solvent to obtain a mixed dispersion; injecting the IL into the HNT in the mixed dispersion under vacuumizing to obtain an IL-filled HNT; and encapsulating the IL-filled HNT at a tube end with an encapsulating material to obtain the HNT-encapsulated IL microcapsule. In the present disclosure, the preparation method modifies an inner surface of the HNT: the HNT is composed of a silicon-oxygen tetrahedron layer and an aluminum-oxygen octahedron layer that are curled and arranged in a lamellar ratio of 1:1. An inner surface of the tube is a positively-charged aluminum-oxygen octahedron layer, and an outer surface is a negatively-charged silicon-oxygen tetrahedron layer. The inner surface of HNT is selectively modified with an alkali metal salt of a fatty acid through electrostatic interaction, thereby facilitating the entry of IL into the lumen of HNT. The IL is introduced into the HNT by vacuumizing and then a tube end is encapsulated to prevent the IL from leaving the lumen of HNT before use. This achieves an effective synergy between the strength properties of HNT and the lubrication properties of IL. Accordingly, the HNT-encapsulated IL microcapsule prepared by the preparation method is used as a lubricant additive of the self-lubricating fiber textile composite, and can realize solid-liquid composite lubrication of a friction interface of the self-lubricating fiber textile composite. In this way, on the premise of reducing abrasion of the self-lubricating fiber textile composite, a friction coefficient of the self-lubricating fiber textile composite is maintained stable during the friction.

The present disclosure further provides a HNT-encapsulated IL microcapsule prepared by the preparation method, including a HNT and an IL encapsulated in the HNT. In the present disclosure, the self-lubricating fiber textile composite is used as a lubricant additive, and can realize solid-liquid composite lubrication of a friction interface of the liner. In this way, on the premise of reducing abrasion of the self-lubricating liner, a friction coefficient of the self-lubricating liner is maintained stable during the friction.

The present disclosure further provides a self-lubricating fiber textile composite, including a self-lubricating textile and a resin and a lubricant additive that are loaded between fibers of the self-lubricating textile, where the lubricant additive is the HNT-encapsulated IL microcapsule. It can be seen from the friction test results of the examples that when the HNT-encapsulated IL microcapsule is added at 1 wt %, the self-lubricating fiber textile composite has a wear rate reduced from $0.96 \times 10^{-14}$ m$^3$/N·m to $0.74 \times 10^{-14}$ m$^3$/N·m, which is reduced by 22.9% compared with the self-lubricating textile material without the lubricant additive. When the microcapsule is added at 2 wt %, the self-lubricating fiber textile composite has a wear rate reduced to $0.50 \times 10^{-14}$ m$^3$/N·m, showing a reduction of 47.9%. When the HNT-encapsulated IL microcapsule is added at 3 wt %, the self-lubricating fiber textile composite has a wear rate of $0.54 \times 10^{-14}$ m$^3$/N·m, which is slightly increased compared to that added at 2 wt %. This may be because excessive amounts of the microcapsule easily lead to agglomeration of the lubricant additive, thereby deteriorating the wear resistance of the self-lubricating fiber textile composite. Due to excellent lubrication properties of the self-lubricating fiber textile itself, the addition of the microcapsule has a less obvious impact on the friction coefficient. All composites have an average friction coefficient ranging from 0.045 to 0.046.

BRIEF DESCRIPTION OF THE DRAWINGS

FIG. 1A: Morphology and microstructure schematic of HNT; FIG. 1B: SEM image of original HNTs; FIG. 1C: TEM image of original HNTs; FIG. 1D: TEM image of a single HNT with inner diameter at 18 nm and outer diameter at 50 nm. The inset in D shown cross section of HNT; FIG. 1E: TEM image of a HNT loaded with [BMIm]PF$_6$. After incorporation of [BMIm]PF$_6$ into HNTs, some lumens are completely filled with IL. Other HNTs partly are blocked and some air bubbles retain in partly filled HNTs owing to discontinuous [BMIm]PF$_6$ injecting; FIG. 1F: TEM image of PDA coated [BMIm]PF$_6$@HNTs microcapsule. A coating approached to 3-6 nm has covered HNT surface and sealed the end of HNT; FIG. 1G The region for element mapping maps of the stuffed HNTs; FIGS. 1H-K: Element mapping maps of the [BMIm]PF$_6$ filled HNTs: H: Si element; I: O element; J: Al element; K: F element; FIG. 2B shows an average friction coefficient of the self-lubricating composite.

DETAILED DESCRIPTION OF THE EMBODIMENTS

Figure 1A:
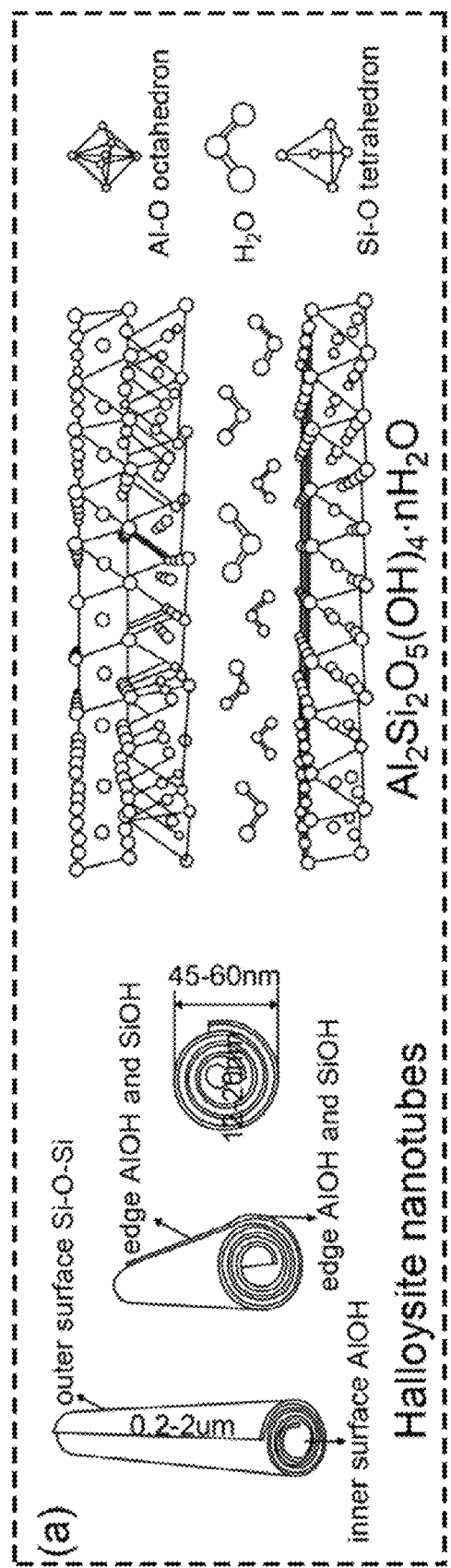
FIGS. 1A-K shows a transmission electron microscopy (TEM) analysis image of HNTs and HNTs-[BMIm]PF$_6$ microcapsules provided by the examples of the present disclosure; where
Figure 1B:
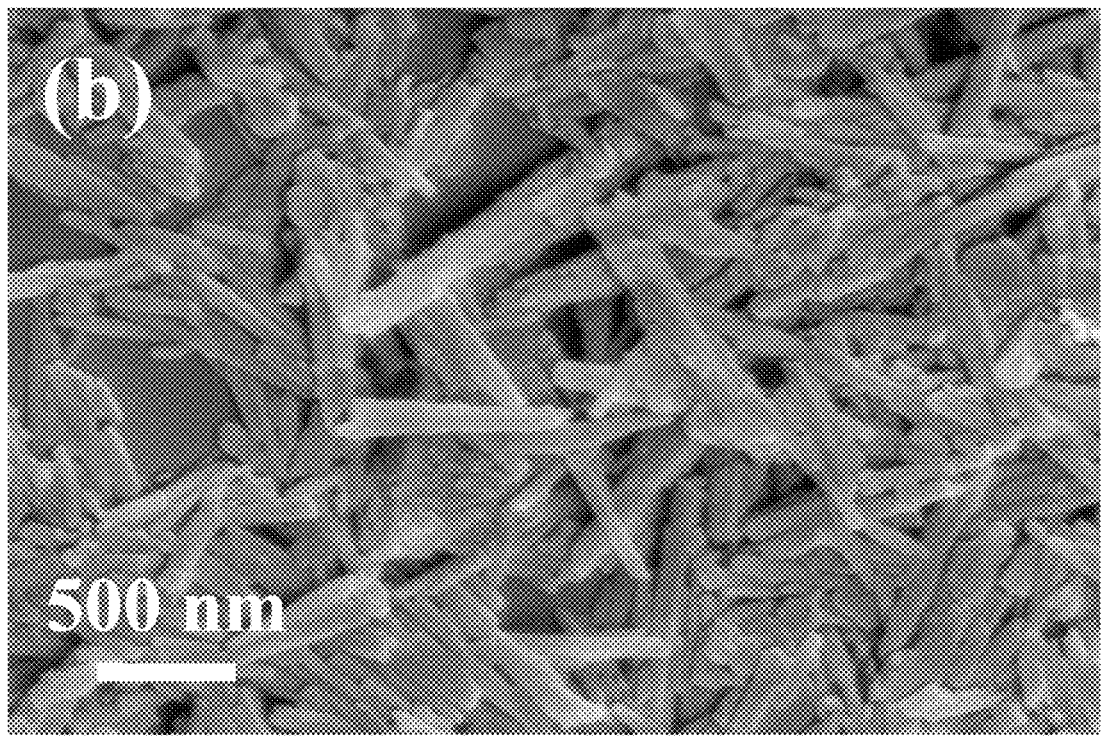
Figure 1C:
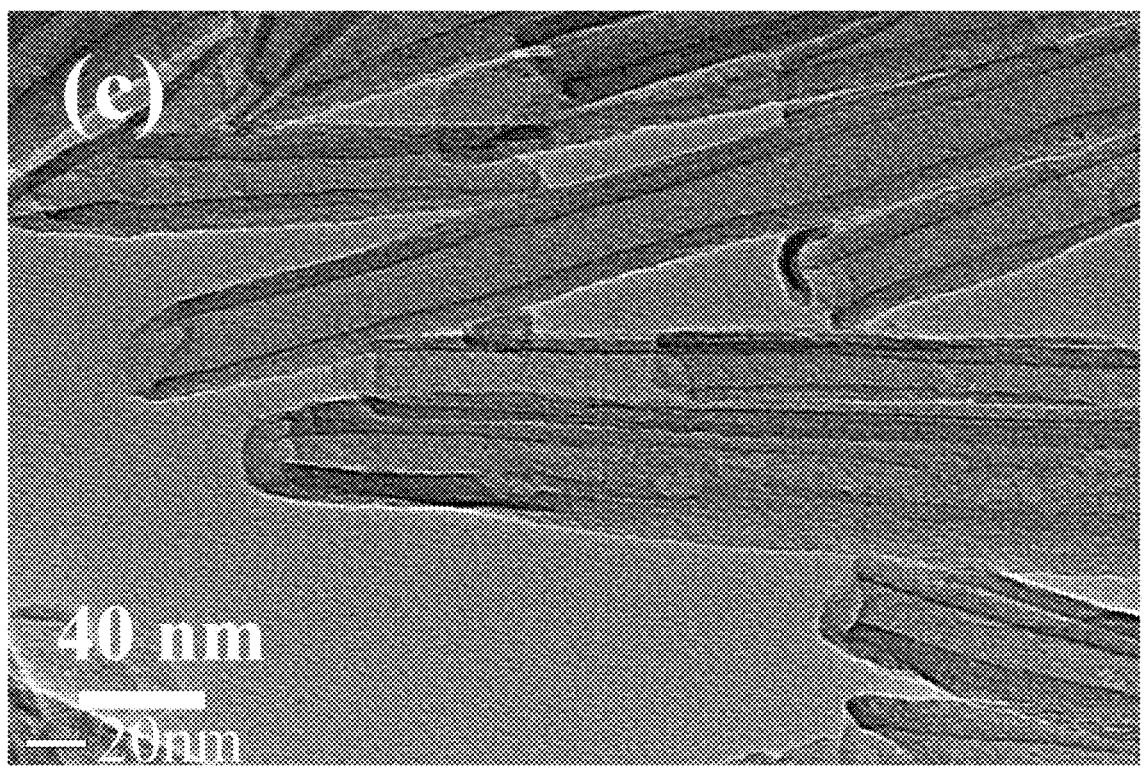
Figure 1D:
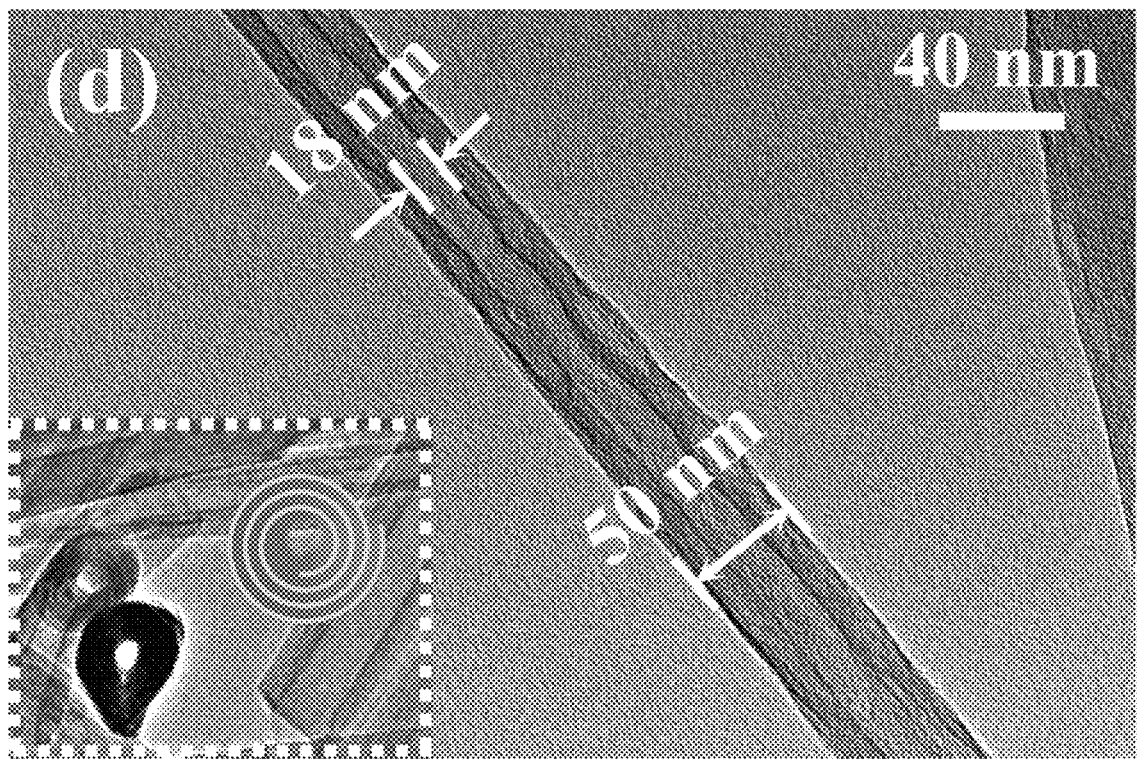
Figure 1E:
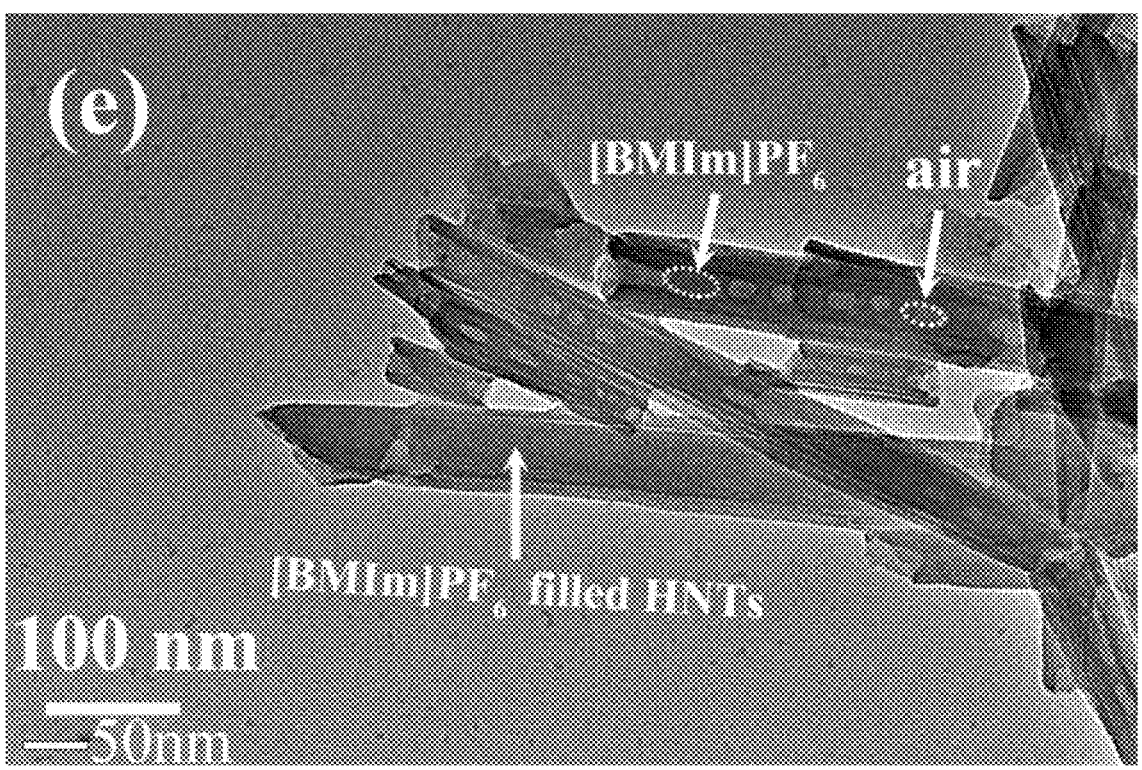
Figure 1F:
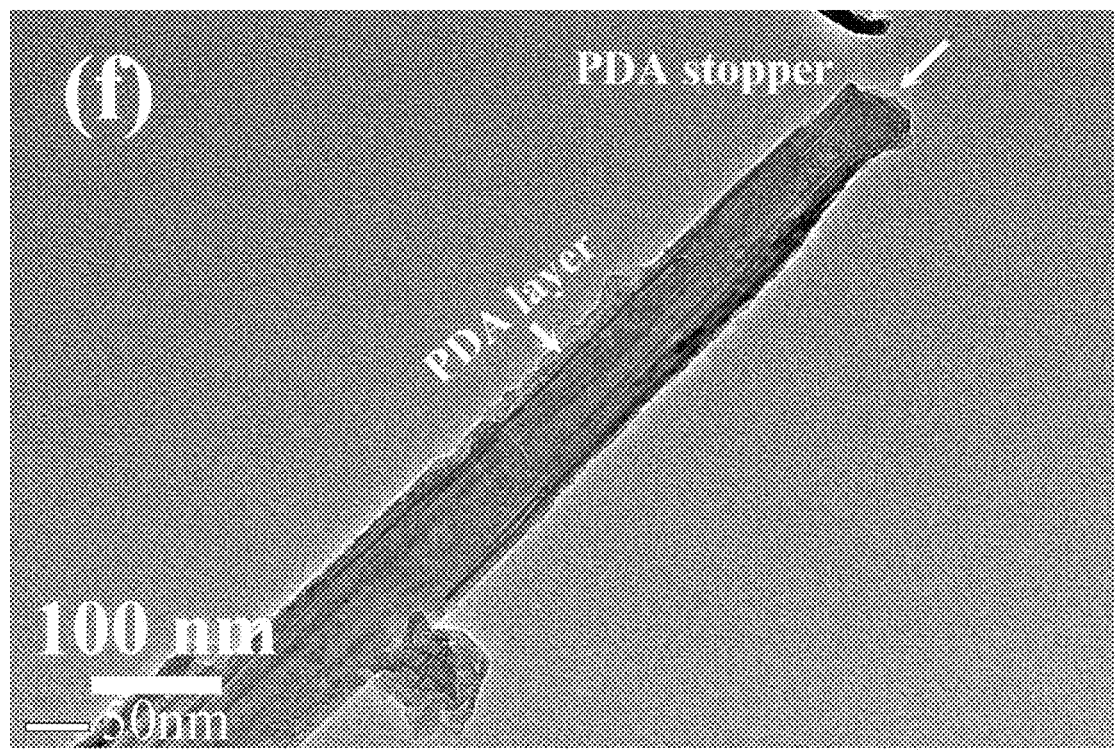
Figure 1G:
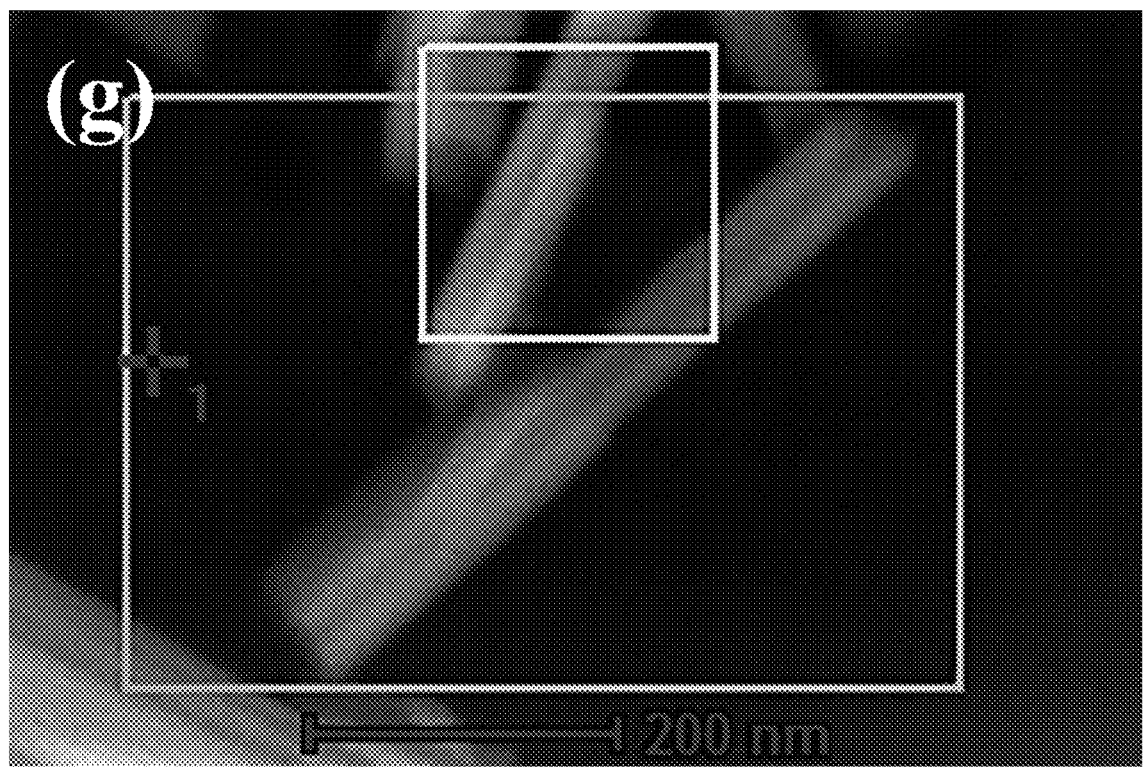
Figure 1H:
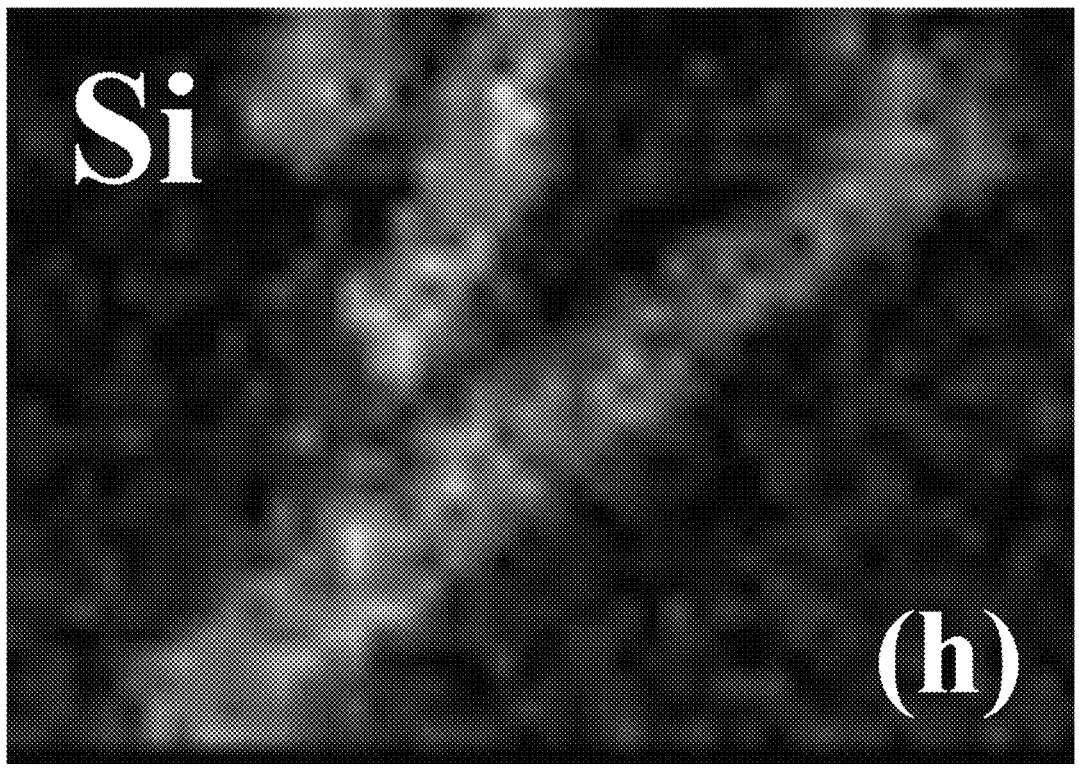
Figure 1I:
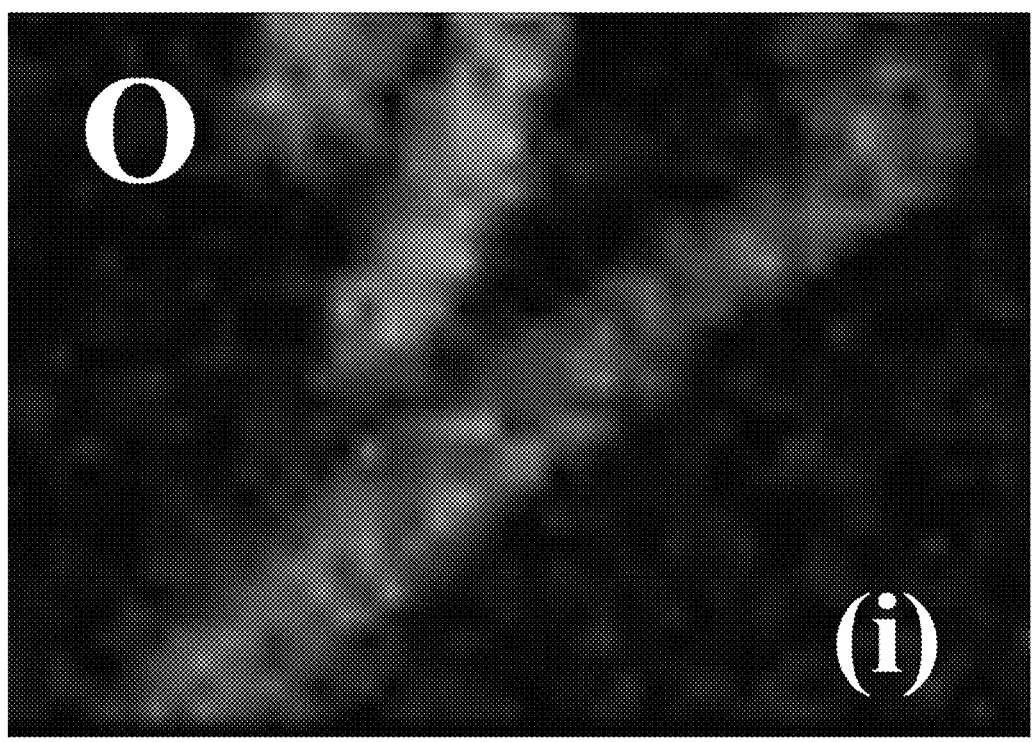
Figure 1J:
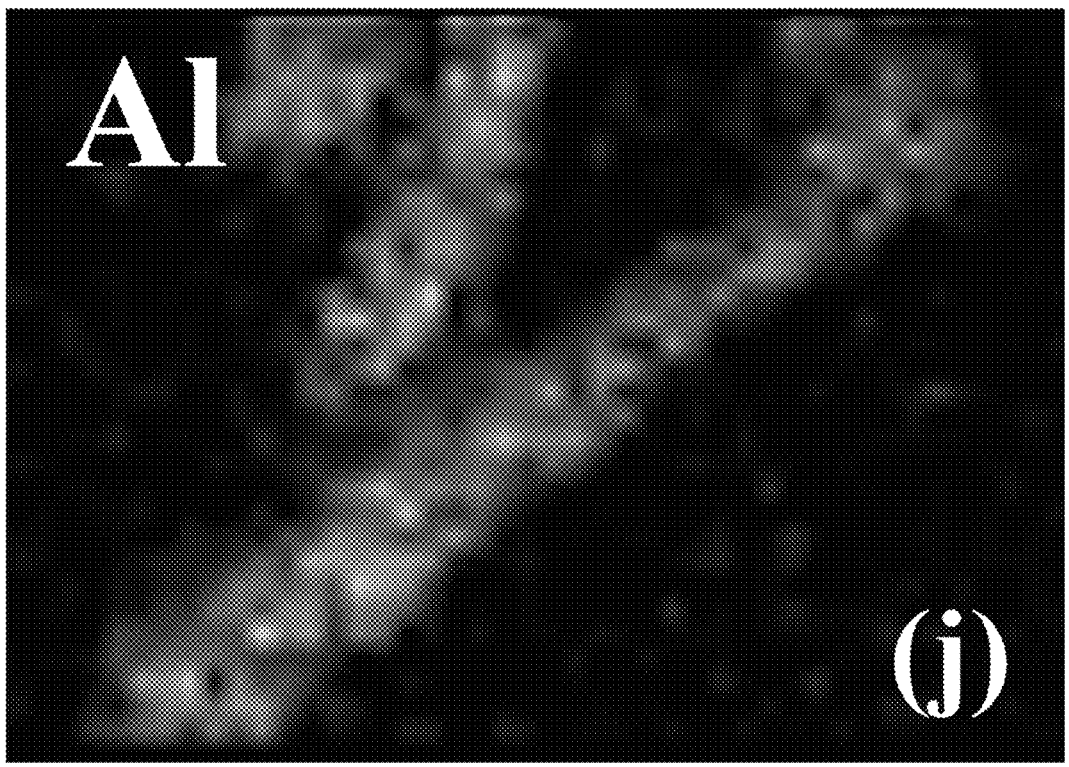
Figure 1K:
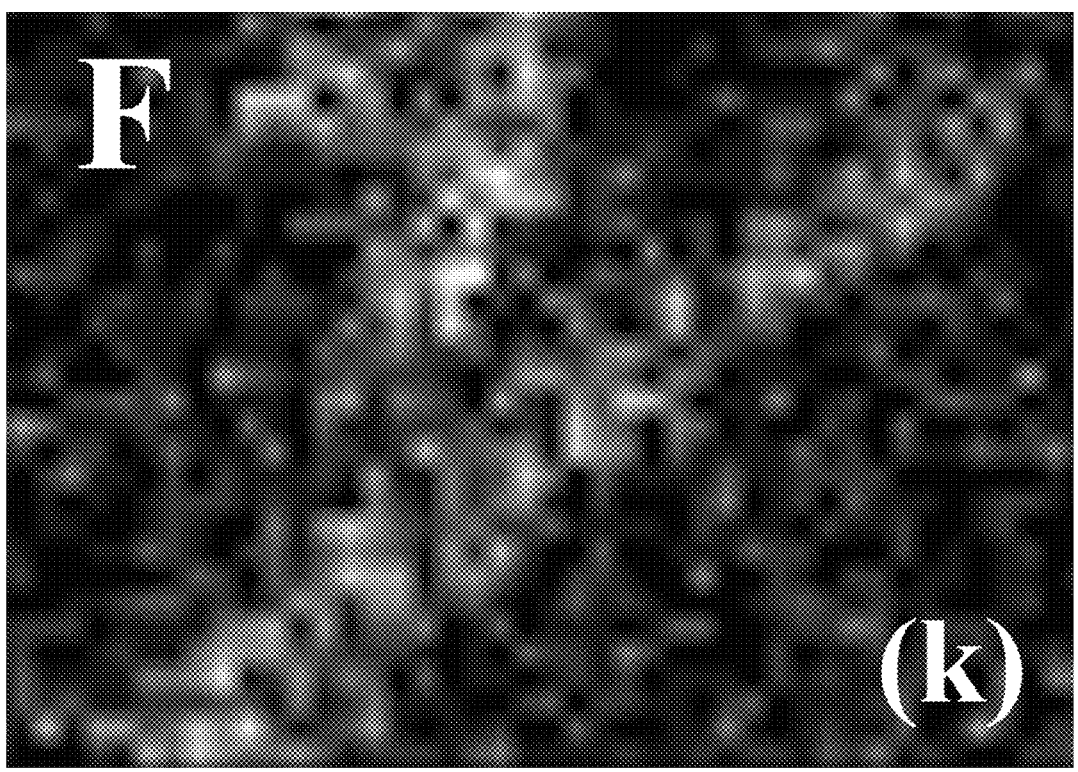
Figure 2A:
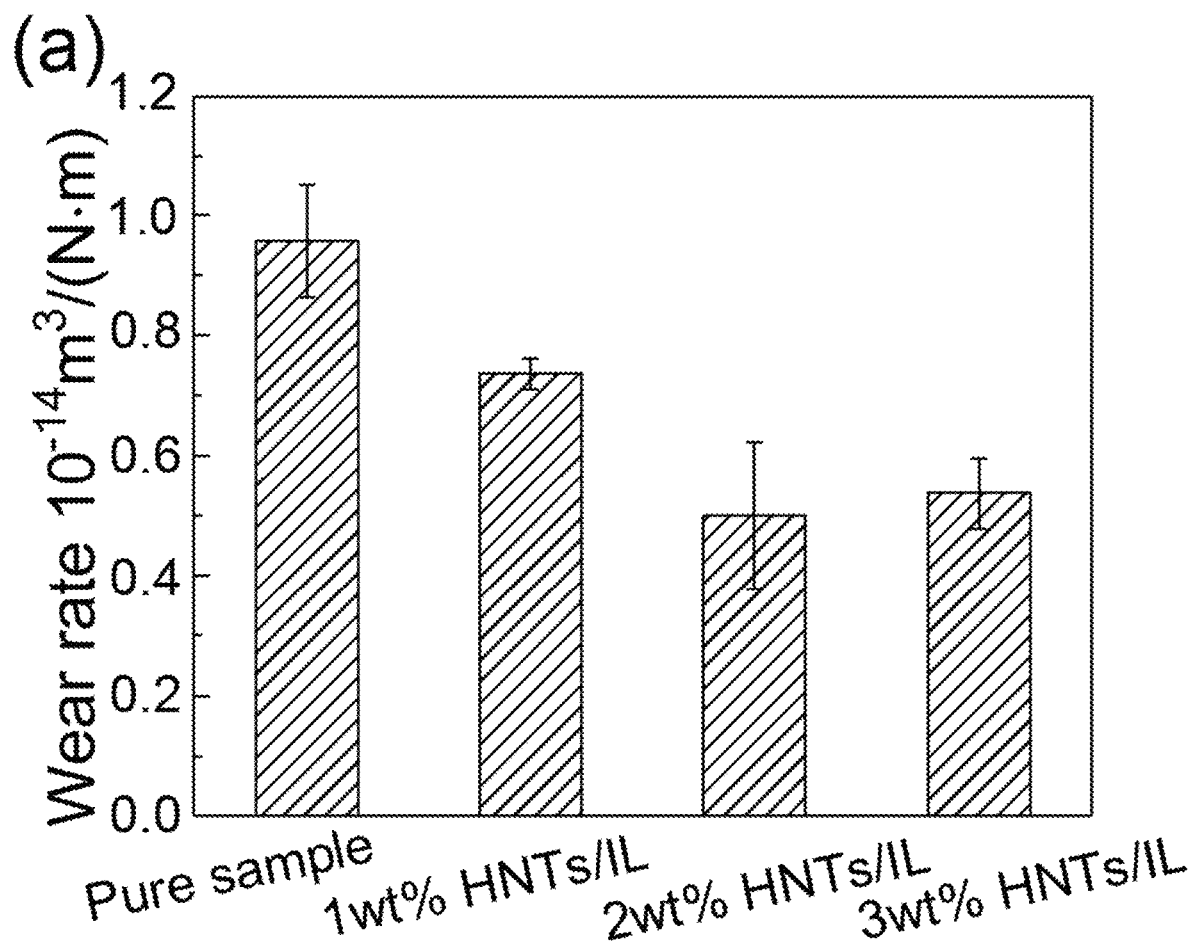
FIGS. 2A-B shows a wear rate of a HNTs-[BMIm]PF$_6$ microcapsule-reinforced PBO/PTFE self-lubricating fiber textile composite prepared in Example 1 of the present disclosure; where FIG. 2A show a wear rate of the self-lubricating composite.
Figure 2B:
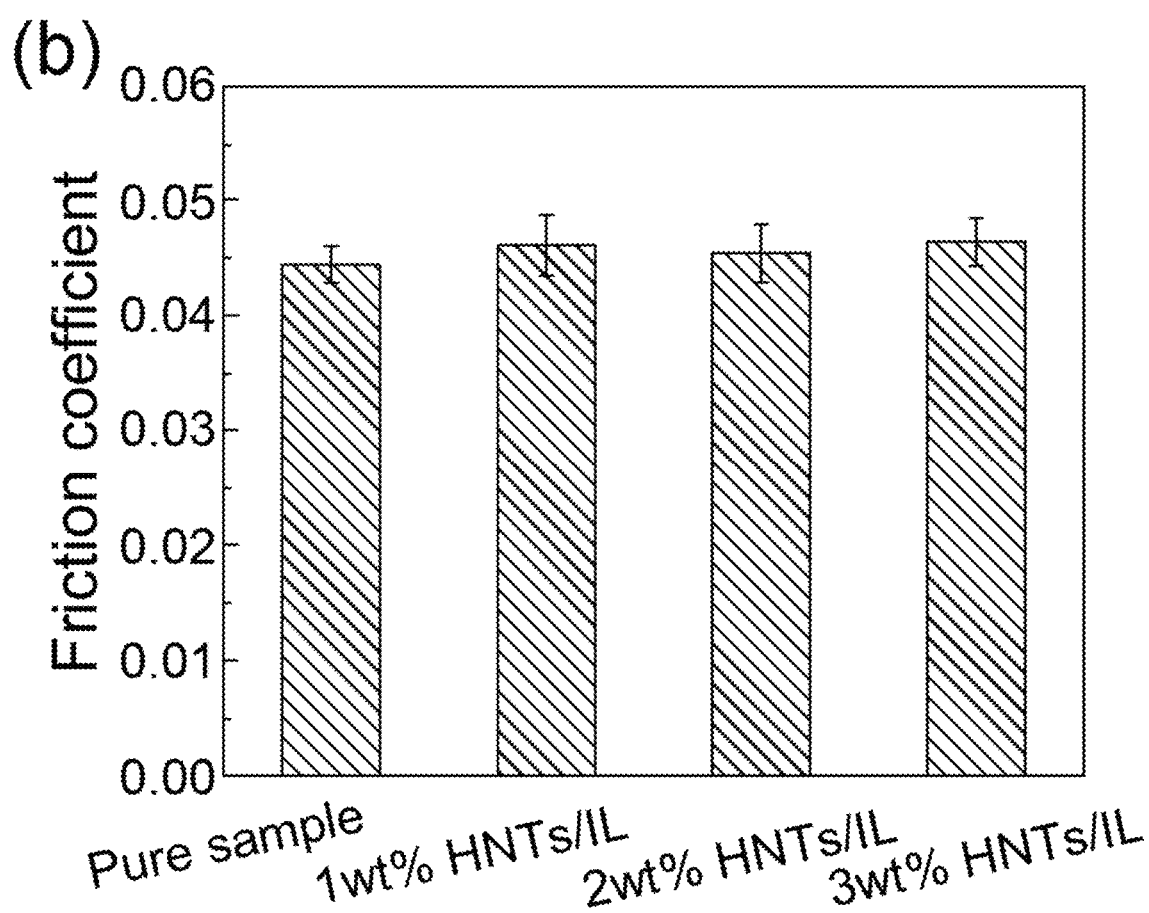

The present disclosure provides a preparation method of a HNT-encapsulated IL microcapsule, including the following steps:
dispersing a HNT and an alkali metal salt of a saturated fatty acid in water, and selectively modifying an inner surface of the HNT to obtain an inner surface-modified HNT;
dispersing the inner surface-modified HNT and an IL in an organic solvent to obtain a mixed dispersion;
injecting the IL into the HNT in the mixed dispersion under vacuumizing to obtain an IL-filled HNT; and
encapsulating the IL-filled HNT at a tube end with an encapsulating material to obtain the HNT-encapsulated IL microcapsule.

In the present disclosure, unless otherwise specified, all raw materials for preparation are commercially available products well known to those skilled in the art.

In the present disclosure, a HNT and an alkali metal salt of a saturated fatty acid are dispersed in water, and an inner surface of the HNT is selectively modified to obtain an inner surface-modified HNT.

In the present disclosure, the HNT has a chemical composition of $Al_2Si_2O_5(OH)_4 \cdot nH_2O$. The HNT is composed of a silicon-oxygen tetrahedron layer and an aluminum-oxygen octahedron layer that are curled and arranged in a lamellar ratio of 1:1, where an inner surface of the tube is a positively-charged aluminum-oxygen octahedron layer, and an outer surface of the tube is a negatively-charged silicon-oxygen tetrahedron layer.

In the present disclosure, the HNT has an inner diameter of preferably 12 nm to 20 nm, more preferably 15 nm to 18 nm, an outer diameter of 45 nm to 60 nm, more preferably 50 nm to 55 nm, and a tube length of preferably 0.2 μm to 2 μm, more preferably 0.5 μm to 1.5 μm.

In the present disclosure, the alkali metal salt of the saturated fatty acid is one or more selected from the group consisting of sodium laurate, sodium undecanoate, and sodium myristate, preferably the sodium laurate.

In the present disclosure, the HNT and the alkali metal salt of the saturated fatty acid are at a mass ratio of preferably (0.1-1):1, more preferably 1:1.

In the present disclosure, the water is preferably deionized water; and there is no special requirement on a dosage of the deionized water, as long as the selectively modifying can be conducted smoothly.

In the present disclosure, the alkali metal salt of the saturated fatty acid is negatively charged and can enter the lumen of the HNT to modify the inner surface of the HNT through electrostatic interaction.

In the present disclosure, the selectively modifying is conducted at preferably a room temperature for preferably 10 h to 36 h, more preferably 15 h to 36 h. The selectively modifying is preferably conducted under stirring; and there are no special requirements for a specific implementation process of the stirring.

In the present disclosure, a modification reaction liquid is obtained after the selectively modifying; preferably, the modification reaction liquid is subjected to post-treatment to obtain the inner surface-modified HNT. The post-treatment includes preferably the following steps: subjecting the modification reaction liquid to solid-liquid separation to obtain a solid product; and subjecting the solid product to water washing and drying sequentially to obtain the inner surface-modified HNT. The solid-liquid separation is preferably conducted by centrifugation; there is no special requirement for a specific implementation process of the centrifugation. The drying preferably refers to freeze-drying; there are no special requirements for a specific implementation process of the freeze-drying.

In the present disclosure, the inner surface-modified HNT and an IL are dispersed in an organic solvent to obtain a mixed dispersion.

In the present disclosure, the IL is one or more selected from the group consisting of 1-butyl-3-methylimidazolium hexafluorophosphate, 1-butyl-3-methylimidazolium trifluoromethanesulfonate ([BMIm][TfO]), and 1-hexyl-3-methylimidazolium bis(trifluoromethylsulfonyl)imide ([EMIm][NTf$_2$]), more preferably the 1-butyl-3-methylimidazolium hexafluorophosphate ([BMIm]PF$_6$).

In the present disclosure, the inner surface-modified HNT and the IL are at a mass ratio of preferably 1:(1-5), more preferably 1:1.

In the present disclosure, the organic solvent is preferably toluene; there is no special requirement on a dosage of the toluene, as long as the inner surface-modified HNT and the IL can be evenly dispersed in the organic solvent.

In the present disclosure, the dispersing of the inner surface-modified HNT and the IL in the organic solvent is preferably conducted under stirring and ultrasonic treatment; there are no special requirements on a specific implementation process of the stirring and ultrasonic treatment; the dispersing is conducted for preferably 30 min.

In the present disclosure, the mixed dispersion is filled with the IL under vacuumizing to obtain an IL-filled HNT.

In the present disclosure, the vacuumizing includes preferably circulating a vacuumizing unit n times; the vacuumizing unit includes preferably the following stages sequentially: a vacuumizing stage, a vacuum maintaining stage, and an inflating stage; the vacuum maintaining stage maintains an ambient pressure of preferably 0.01 atm to 0.05 atm for preferably 5 min to 30 min, more preferably 10 min to 15 min; n is greater than or equal to 3, more preferably 3.

In the present disclosure, the vacuumizing stage has a depressurization time of preferably 10 min to 15 min, more preferably 15 min.

In the present disclosure, the inflating stage has a pressurization time of preferably 10 min to 15 min, more preferably 15 min.

In the present disclosure, the mixed dispersion is preferably placed in a vacuumizing device. The vacuumizing device is vacuumized by a vacuum pump to achieve the vacuumizing, such that the HNT is filled with the IL under the vacuumizing.

In the present disclosure, a filled sample is obtained after the IL is filled; the filled sample is preferably dried to obtain the IL-filled HNT. The drying preferably refers to vacuum drying at 60° C. for 12 h to 15 h.

In the present disclosure, the IL-filled HNT is encapsulated at a tube end with an encapsulating material to obtain the HNT-encapsulated IL microcapsule.

In the present disclosure, the encapsulating material includes preferably polydopamine.

In the present disclosure, the lubricating oil includes preferably one or more of poly(α-olefin), ester oil, and polysiloxane.

In the present disclosure, when the encapsulating material is preferably the polydopamine, the encapsulating at tube end includes preferably the following steps: mixing the IL-filled HNT, a polymerization solvent, and dopamine hydrochloride to allow polymerization. The polymerization solvent is preferably a Tris-HCL buffer solution, and the Tris-HCL buffer solution has a pH value of 8.5. The IL-filled HNT and the dopamine hydrochloride are at a mass ratio of preferably (0.5-0.6):1. A process of mixing the IL-filled HNT, the polymerization solvent, and the dopamine hydrochloride includes the following steps: dispersing the IL-filled HNT into the polymerization solvent to obtain an IL-filled HNT dispersion; and mixing the IL-filled HNT dispersion and the dopamine hydrochloride. The dispersing includes preferably stirring dispersing and ultrasonic dispersing in sequence; the stirring dispersing is conducted for preferably 30 min, and the ultrasonic dispersing is conducted for preferably 5 min. The polymerization is conducted at preferably a room temperature for preferably 24 h under preferably stirring.

In the present disclosure, a polymerization reaction liquid is obtained after the polymerization; preferably, the polymerization reaction liquid is subjected to post-treatment to obtain the HNT-encapsulated IL microcapsule. The post-treatment includes preferably the following steps: subjecting the polymerization reaction liquid to solid-liquid separation to obtain a solid product; and subjecting the solid product to water washing and drying to obtain the HNT-encapsulated IL microcapsule. In the present disclosure, the solid-liquid separation is preferably conducted by suction filtration.

The present disclosure further provides a HNT-encapsulated IL microcapsule prepared by the preparation method, including a HNT and an IL encapsulated in the HNT.

The present disclosure further provides use of the HNT-encapsulated IL microcapsule as a lubricant additive.

The present disclosure further provides a self-lubricating fiber textile composite, including a self-lubricating textile and a resin and a lubricant additive that are loaded between fibers of the self-lubricating textile, where the lubricant additive is the HNT-encapsulated IL microcapsule.

In the present disclosure, the self-lubricating textile is preferably woven from a PTFE fiber and a reinforcing fiber. In a specific example, the self-lubricating textile is preferably a PBO/PTFE lubricating fiber textile woven from a PBO fiber and the PTFE fiber.

In the present disclosure, the self-lubricating textile accounts for preferably 50 wt % to 85 wt %, more preferably 55 wt % to 84 wt % of the self-lubricating fiber textile composite by mass percentage.

In the present disclosure, the lubricant additive accounts for preferably less than or equal to 3 wt %, more preferably 1 wt % to 3 wt % of the self-lubricating fiber textile composite by mass percentage.

In the present disclosure, the resin includes preferably one or more of phenolic resin, polyimide resin, epoxy resin, and polyamide-imide, more preferably the phenolic resin.

In the present disclosure, the resin is used to bond the lubricant additive between fibers of the self-lubricating fiber textile, as well as serves as a reinforcing component of the self-lubricating fiber textile composite.

The present disclosure further provides a preparation method of the self-lubricating fiber textile composite, including the following steps:
dispersing the lubricant additive in a resin solution to obtain a lubricant additive-resin dispersion;
impregnating the self-lubricating textile with the lubricant additive-resin dispersion to obtain a prepreg; and
curing the prepreg to obtain the self-lubricating fiber textile composite.

In the present disclosure, the lubricant additive is dispersed in a resin solution to obtain a lubricant additive-resin dispersion.

In the present disclosure, the resin solution includes preferably one or more of a phenolic resin solution, a polyimide resin solution, an epoxy resin solution, and a polyamide-imide solution, more preferably the phenolic resin solution.

In the present disclosure, a solvent in the phenolic resin solution is preferably a mixed solvent of ethanol, ethyl acetate, and acetone, and the ethanol, the ethyl acetate, and the acetone are at a volume ratio of preferably 1:1:1.

In the present disclosure, a solvent in the polyimide resin solution is preferably N,N-dimethylacetamide.

In the present disclosure, a solvent in the epoxy resin solution is preferably a mixed solvent of ethyl acetate and acetone, and the ethyl acetate and the acetone are at a volume ratio of preferably 1:1.

In the present disclosure, a solvent in the polyamide-imide solution is preferably N-methylpyrrolidone.

In the present disclosure, the resin solution has a solid content of preferably 0.144 g/mL to 0.147 g/mL.

In the present disclosure, the lubricant additive in the lubricant additive-resin dispersion has a mass percentage of preferably 0.1 wt % to 6 wt %, more preferably 0.5 wt % to 5 wt %.

In the present disclosure, the dispersing is preferably conducted under ultrasonic treatment.

In the present disclosure, the self-lubricating textile is impregnated with the lubricant additive-resin dispersion to obtain a prepreg.

In the present disclosure, the impregnating is conducted preferably greater than or equal to 2 times.

In the present disclosure, between the 2 times of impregnating, a prepreg obtained is preferably dried; the drying is preferably oven drying; and the oven drying is conducted at preferably 30° C. to 80° C., more preferably 45° C. to 60° C.

In the present disclosure, the impregnating is conducted at preferably a room temperature.

In the present disclosure, the prepreg is cured to obtain the self-lubricating fiber textile composite.

In the present disclosure, before the curing, the prepreg is preferably bonded to a friction pair surface with a resin adhesive.

In the present disclosure, the resin adhesive includes preferably one or more of a phenolic resin adhesive, a polyimide resin adhesive, an epoxy resin adhesive, and a polyamide-imide adhesive, and more preferably the phenolic resin adhesive.

In the present disclosure, during the bonding, a type of the resin adhesive is preferably the same as that of the resin in the prepreg.

In the present disclosure, the curing is conducted at preferably 150° C. to 200° C., more preferably 160° C. to 190° C.

In the present disclosure, the curing is conducted for preferably 1 h to 5 h, more preferably 1.5 h to 3 h.

The present disclosure further provides use of the self-lubricating fiber textile composite or a self-lubricating fiber textile composite prepared by the preparation method as a self-lubricating liner.

In the present disclosure, the use is particularly preferably a self-lubricating liner of a self-lubricating spherical plain bearing.

In the present disclosure, the use is preferably conducted under dynamic load conditions.

In the present disclosure, the use is preferably conducted at a room temperature.

In the present disclosure, the bearing has a load of 55 MPa and a speed of 0.8 m/s during the use.

In order to further illustrate the present disclosure, the technical solutions provided by the present disclosure are described in detail below in connection with accompanying drawings and examples, but these examples should not be understood as limiting the claimed scope of the present disclosure.

Example 1

(1) 1 g of HNTs (with an inner diameter of 20 nm, an outer diameter of 60 nm, and a tube length of 2 μm) and 1 g of sodium laurate were dispersed into 100 mL of deionized water, stirred at room temperature for 36 h, centrifuged, washed, and freeze-dried to obtain sodium laurate-modified HNTs.

(2) 0.3 g of the sodium laurate-modified HNTs and 0.3 g of [BMIm]PF$_6$ were dispersed into 10 mL of toluene, stirred and ultrasonically dispersed for 30 min; an obtained dispersion was slowly vacuumized in a vacuumizing device for 15 min, a vacuum valve was turned off to maintain a vacuum state of 0.05 atm for 10 min, and the vacuum valve was slightly turned on to gradually restore an atmospheric pressure after 15 min; after repeating the above operation three times, an obtained sample was dried in a vacuum drying oven at 60° C. for 15 h to obtain unencapsulated HNTs containing [BMIm]PF$_6$.

(3) 0.6 g of the unencapsulated HNTs containing [BMIm]PF$_6$ obtained in step (2) were dispersed into 100 mL of a Tris-HCl (PH=8.5) buffer solution, stirred magnetically for 30 min, ultrasonically treated for 5 min, added with 0.1 g of dopamine hydrochloride and stirred for 24 h, and then filtered, washed, and dried to obtain a HNT-encapsulated [BMIm]PF$_6$ microcapsule, denoted as HNTs-[BMIm]PF$_6$ microcapsule.

Example 2

The HNTs-[BMIm]PF$_6$ microcapsule prepared in Example 1 was dispersed in a phenolic resin solution (with a solid content of 0.144 g/mL, where a solvent was a mixed solvent of ethanol, ethyl acetate, and acetone at a volume ratio of 1:1:1), to obtain a HNTs-[BMIm]PF$_6$ microcapsule-resin dispersion; where a HNTs-[BMIm]PF$_6$ microcapsule phase accounted for 1 wt % of the phenolic resin solution by mass fraction.

A PBO/PTFE fiber textile gray cloth was repeatedly immersed in the HNTs-[BMIm]PF$_6$ microcapsule-resin dispersion until the PBO/PTFE fiber textile gray cloth in a resulting PBO/PTFE fiber textile composite had a mass fraction of (75±5) wt %, to obtain a PBO/PTFE fiber prepreg; the PBO/PTFE fiber prepreg was bonded to a test piece for friction wear and peeling with a phenolic resin adhesive, and then cured at 184° C. for 2 h to obtain a friction test piece; a surface of the friction test piece had a PBO/PTFE fiber textile composite liner.

The PBO/PTFE fiber textile composite liner was evaluated for friction and wear performances using a pin-on-disk friction and wear tester, at a load of 55 MPa and a speed of 0.8 m/s for 120 min; the results showed that the liner had an average wear rate of $0.74 \times 10^{-14}$ m$^3$/N·m and an average friction coefficient of 0.046.

Example 3

The HNTs-[BMIm]PF$_6$ microcapsule prepared in Example 1 was dispersed in a phenolic resin solution (with a solid content of 0.146 g/mL, where a solvent was a mixed solvent of ethanol, ethyl acetate, and acetone at a volume ratio of 1:1:1), to obtain a HNTs-[BMIm]PF$_6$ microcapsule-resin dispersion; where a HNTs-[BMIm]PF$_6$ microcapsule phase accounted for 2 wt % of the phenolic resin solution by mass fraction.

A PBO/PTFE fiber textile gray cloth was repeatedly immersed in the HNTs-[BMIm]PF$_6$ microcapsule-resin dispersion until the PBO/PTFE fiber textile gray cloth in a resulting PBO/PTFE fiber textile composite had a mass fraction of (75±5) wt %, to obtain a PBO/PTFE fiber prepreg; the PBO/PTFE fiber prepreg was bonded to a test piece for friction wear and peeling with a phenolic resin adhesive, and then cured at 184° C. for 2 h to obtain a friction test piece; a surface of the friction test piece had a PBO/PTFE fiber textile composite liner.

The PBO/PTFE fiber textile composite liner was evaluated for friction and wear performances using a pin-on-disk friction and wear tester, at a load of 55 MPa and a speed of 0.8 m/s for 120 min; the results showed that the liner had an average wear rate of $0.50 \times 10^{-14}$ m$^3$/N·m and an average friction coefficient of 0.045.

Example 4

The HNTs-[BMIm]PF$_6$ microcapsule prepared in Example 1 was dispersed in a phenolic resin solution (with a solid content of 0.147 g/mL, where a solvent was a mixed solvent of ethanol, ethyl acetate, and acetone at a volume ratio of 1:1:1), to obtain a HNTs-[BMIm]PF$_6$ microcapsule-resin dispersion; where a HNTs-[BMIm]PF$_6$ microcapsule phase accounted for 3 wt % of the phenolic resin solution by mass fraction.

A PBO/PTFE fiber textile gray cloth was repeatedly immersed in the HNTs-[BMIm]PF$_6$ microcapsule-resin dispersion until the PBO/PTFE fiber textile gray cloth in a resulting PBO/PTFE fiber textile composite had a mass fraction of (75±5) wt %, to obtain a PBO/PTFE fiber prepreg; the PBO/PTFE fiber prepreg was bonded to a test piece for friction wear and peeling with a phenolic resin adhesive, and then cured at 184° C. for 2 h to obtain a friction test piece; a surface of the friction test piece had a PBO/PTFE fiber textile composite liner.

The PBO/PTFE fiber textile composite liner was evaluated for friction and wear performances using a pin-on-disk friction and wear tester, at a load of 55 MPa and a speed of 0.8 m/s for 120 min; the results showed that the liner had an average wear rate of $0.54 \times 10^{-14}$ m$^3$/N·m and an average friction coefficient of 0.046.

Although the present disclosure is described in detail in conjunction with the foregoing examples, they are only a part of, not all of, the examples of the present disclosure. Other examples can be obtained based on these examples without creative efforts, and all of these examples shall fall within the protection scope of the present disclosure.

What is claimed is:

1. A preparation method of a halloysite nanotube (HNT)-encapsulated ionic liquid (IL) microcapsule, comprising the following steps:
   dispersing a HNT and an alkali metal salt of a saturated fatty acid in water, and selectively modifying an inner surface of the HNT to obtain an inner surface-modified HNT; wherein
   the alkali metal salt of the saturated fatty acid is one or more selected from the group consisting of sodium laurate, sodium undecanoate, and sodium myristate; and
   the HNT and the alkali metal salt of the saturated fatty acid are at a mass ratio of (0.1-1):1;
   dispersing the inner surface-modified HNT and an IL in an organic solvent to obtain a mixed dispersion;
   injecting the IL into the HNT in the mixed dispersion under vacuumizing to obtain an IL-filled HNT; and
   encapsulating the IL-filled HNT at a tube end with an encapsulating material to obtain the HNT-encapsulated IL microcapsule.

2. The preparation method according to claim 1, wherein the HNT has an inner diameter of 12 nm to 20 nm, an outer diameter of 45 nm to 60 nm, and a tube length of 0.2 μm to 2 μm.

3. The preparation method according to claim 1, wherein the IL is one or selected more from the group consisting of 1-butyl-3-methylimidazolium hexafluorophosphate, 1-butyl-3-methylimidazolium trifluoromethanesulfonate, and 1-hexyl-3-methylimidazolium bis(trifluoromethylsulfonyl)imide; and the inner surface-modified HNT and the IL are at a mass ratio of 1:(1-5).

4. The preparation method according to claim 1, wherein the vacuumizing comprises circulating a vacuumizing unit n times; the vacuumizing unit comprises the following stages sequentially: a vacuumizing stage, a vacuum maintaining stage, and an inflating stage; the vacuum maintaining stage maintains an ambient pressure of 0.01 atm to 0.05 atm for 5 min to 30 min; n is greater than or equal to 3;

the vacuumizing stage has a depressurization time of 10 min to 15 min; and the inflating stage has a pressurization time of 10 min to 15 min.

5. A HNT-encapsulated IL microcapsule prepared by the preparation method according to claim 1, comprising a HNT and an IL encapsulated in the HNT.

6. The HNT-encapsulated IL microcapsule according to claim 5, wherein the HNT has an inner diameter of 12 nm to 20 nm, an outer diameter of 45 nm to 60 nm, and a tube length of 0.2 μm to 2 μm.

7. The HNT-encapsulated IL microcapsule according to claim 5, wherein the IL is one or more selected from the group consisting of 1-butyl-3-methylimidazolium hexafluorophosphate, 1-butyl-3-methylimidazolium trifluoromethanesulfonate, and 1-hexyl-3-methylimidazolium bis(trifluoromethylsulfonyl)imide; and the inner surface-modified HNT and the IL are at a mass ratio of 1:(1-5).

8. The HNT-encapsulated IL microcapsule according to claim 5, wherein the vacuumizing comprises circulating a vacuumizing unit n times; the vacuumizing unit comprises the following stages sequentially: a vacuumizing stage, a vacuum maintaining stage, and an inflating stage; the vacuum maintaining stage maintains an ambient pressure of 0.01 atm to 0.05 atm for 5 min to 30 min; n is greater than or equal to 3;

the vacuumizing stage has a depressurization time of 10 min to 15 min; and the inflating stage has a pressurization time of 10 min to 15 min.

9. A self-lubricating fiber textile composite, comprising a self-lubricating textile and a resin and a lubricant additive that are loaded between fibers of the self-lubricating textile, wherein the lubricant additive is the HNT-encapsulated IL microcapsule according to claim 5.

10. A self-lubricating fiber textile composite, comprising a self-lubricating textile and a resin and a lubricant additive that are loaded between fibers of the self-lubricating textile, wherein the lubricant additive is the HNT-encapsulated IL microcapsule according to claim 6.

11. A self-lubricating fiber textile composite, comprising a self-lubricating textile and a resin and a lubricant additive that are loaded between fibers of the self-lubricating textile, wherein the lubricant additive is the HNT-encapsulated IL microcapsule according to claim 7.

12. A self-lubricating fiber textile composite, comprising a self-lubricating textile and a resin and a lubricant additive that are loaded between fibers of the self-lubricating textile, wherein the lubricant additive is the HNT-encapsulated IL microcapsule according to claim 8.

13. The self-lubricating fiber textile composite according to claim 9, wherein the self-lubricating textile accounts for 50 wt % to 85 wt % of the self-lubricating fiber textile composite by mass percentage; and the lubricant additive accounts for less than or equal to 3 wt % of the self-lubricating fiber textile composite by mass percentage.

14. The self-lubricating fiber textile composite according to claim 10, wherein the self-lubricating textile accounts for 50 wt % to 85 wt % of the self-lubricating fiber textile composite by mass percentage; and the lubricant additive accounts for less than or equal to 3 wt % of the self-lubricating fiber textile composite by mass percentage.

15. The self-lubricating fiber textile composite according to claim 11, wherein the self-lubricating textile accounts for 50 wt % to 85 wt % of the self-lubricating fiber textile composite by mass percentage; and the lubricant additive accounts for less than or equal to 3 wt % of the self-lubricating fiber textile composite by mass percentage.

16. The self-lubricating fiber textile composite according to claim 12, wherein the self-lubricating textile accounts for 50 wt % to 85 wt % of the self-lubricating fiber textile composite by mass percentage; and the lubricant additive accounts for less than or equal to 3 wt % of the self-lubricating fiber textile composite by mass percentage.

17. A preparation method of the self-lubricating fiber textile composite according to claim 9, comprising the following steps:

dispersing the lubricant additive in a resin solution to obtain a lubricant additive-resin dispersion;

impregnating the self-lubricating textile with the lubricant additive-resin dispersion to obtain a prepreg; and curing the prepreg to obtain the self-lubricating fiber textile composite.

18. A preparation method of the self-lubricating fiber textile composite according to claim 13, comprising the following steps:

dispersing the lubricant additive in a resin solution to obtain a lubricant additive-resin dispersion;

impregnating the self-lubricating textile with the lubricant additive-resin dispersion to obtain a prepreg; and curing the prepreg to obtain the self-lubricating fiber textile composite.

* * * * *